United States Patent [19]
Jacobs, III et al.

[11] Patent Number: 5,256,713
[45] Date of Patent: Oct. 26, 1993

[54] GLYCOLURIL POWDER COATING COMPOSITIONS

[75] Inventors: William Jacobs, III, Bethel; Donna A. Foster, Stratford; Sami M. Sansur, Darien, all of Conn.

[73] Assignee: American Cyanamid Company, Stamford, Conn.

[21] Appl. No.: 869,695

[22] Filed: Apr. 16, 1992

[51] Int. Cl.$^5$ .............. C08K 5/3435; C08K 5/09; C08K 3/26; C08K 3/22

[52] U.S. Cl. ..................... 524/99; 524/251; 524/252; 524/399; 524/425; 524/430; 524/433; 524/436; 524/437; 524/904

[58] Field of Search .............. 524/251, 252, 399, 425, 524/430, 435, 436, 437, 99, 904

[56] References Cited

U.S. PATENT DOCUMENTS

| | | | |
|---|---|---|---|
| 4,064,191 | 12/1977 | Parekh | 525/132 |
| 4,118,437 | 10/1978 | Parekh | 525/443 |
| 4,197,353 | 4/1980 | Tobias et al. | 528/305 |
| 4,214,040 | 7/1980 | Meyer et al. | 524/433 |
| 4,271,277 | 6/1981 | Golownia | 524/904 |
| 4,352,924 | 10/1982 | Wooten et al. | 528/302 |
| 5,097,006 | 3/1992 | Kapilow et al. | 524/91 |

FOREIGN PATENT DOCUMENTS

| | | | |
|---|---|---|---|
| 0213887 | 3/1987 | European Pat. Off. | 524/399 |
| 0006069 | 1/1989 | Japan | 524/430 |
| 0014252 | 1/1990 | Japan | 524/425 |

OTHER PUBLICATIONS

Powderlink ® 1174 Product Brochure, 1990.
Powderlink ® MTSI Catalyst Brochure, 1990.

Primary Examiner—Paul R. Michl
Assistant Examiner—Peter Szekely
Attorney, Agent, or Firm—M. J. Kelly; F. M. Van Riet; B. E. Lerman

[57] ABSTRACT

Glycoluril based amino resin powder coating compositions have improved flow out and viscosity characteristics when a rheology improving additive selected from alkali metal oxides, alkali metal hydroxides, alkali metal carbonates, alkaline earth metal carbonates, alkaline earth metal oxides, alkaline earth metal hydroxides, aluminum oxides, aluminum hydroxides, aluminum carbonates, zinc salts of long chain fatty acids, aluminum salts of long chain fatty acids, monoamines, dismines, or mixtures thereof are added.

32 Claims, 2 Drawing Sheets

GLYCOLURIL POWDER COATING COMPOSITIONS

BACKGROUND OF THE INVENTION

A desirable property of powder coating compositions is that they maintain suitable flow out and cure characteristics during application to a substrate. Typically, a powder coating composition which is applied to a surface heated, and melts, experiences a reduction in viscosity, and flows out onto its substrate. If the viscosity of the powder coating melt remains sufficiently low for a sufficient time, then volatile byproducts in the coating can escape. Continued heating of the powder coating begins crosslinking with the consequence that the viscosity increases and any remaining defects are trapped in the coating.

The use of solid glycoluril type amino resin crosslinkers are generally advantageous in powder coating compositions. However, volatile byproducts, such as methanol are evolved during cure. It is important that improved formulations be developed which provide opportunity for such glycoluril amino resin byproducts to escape during the coating process to give coatings of improved appearance and thickness.

Glycoluril resin type amino crosslinking systems such as those containing tetramethoxymethyl glycoluril may produce pinholes in thicker films (over about 89 microns due to methanol outgassing. It has now been discovered that addition of suitable rheology control additives allows for the production of defect free films thicknesses in excess of 115 microns.

FIELD OF THE INVENTION

This invention is an improvement in amino resin based powder coating compositions.

SUMMARY OF THE INVENTION

This invention is an improved powder coating composition comprising; (i) a solid glycoluril amino resin crosslinker, (ii) a solid hydroxyl functional resin, (iii) a strong acid catalyst, and (iv) a rheology improving additive, wherein the improvement comprises using a rheology improving additive selected from the group consisting of alkali metal oxides, alkali metal hydroxides, alkali metal carbonates, alkaline earth metal carbonates, alkaline earth metal oxides, alkaline earth hydroxides, aluminum oxides, aluminum hydroxides, aluminum carbonates, zinc salts of long chain fatty acids, aluminum salts of long chain fatty acids, monoamines, and diamines.

This invention is also an improved method of coating substrates by applying the novel powder coating composition of this invention and heating the coating to effect flow out and cure.

DETAILED DESCRIPTION OF THE INVENTION

Figure 1:
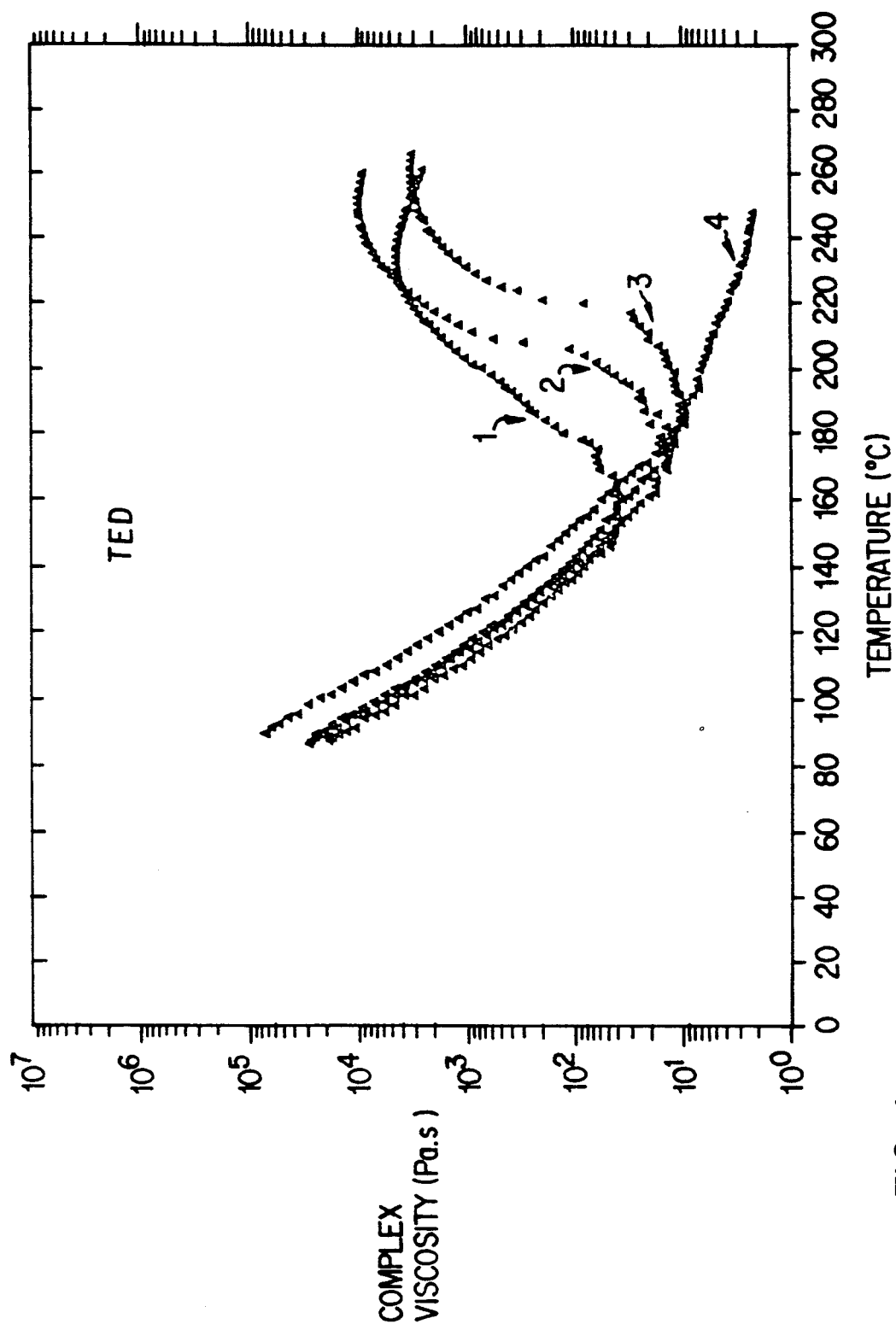
FIG. 1 is a rheology curve of glycoluril type amino resin crosslinked powder coating compositions with and without the rheology improving additive, triethylenediamine.

The essential ingredients of the coating composition of this invention are as follows:
1. a solid glycoluril amino resin
2. a solid hydroxyl functional resin
3. a strong acid catalyst
4. a rheology improving additive The Solid Glycoluril Amino Resin Ingredient:

The essential amino resin crosslinking agent of the formulation of the invention is predominantly monomeric tetramethoxymethyl glycoluril represented by the formula:

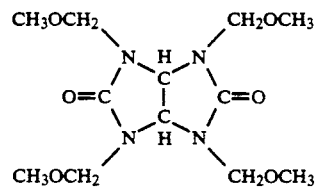

This glycoluril crosslinker is marketed as POWDERLINK ® 1174 Crosslinking Agent by American Cyanamid company (Wayne, N.J. U.S.A.) and has the following characteristics:
Physical form: White to pale yellow flakes
Non-volatiles: 98% by weight
Melting range: 90°–1100° C.
Ave. Mol. Wt.: 350
Equivalent Wt.: 90–125

The Solid Hydroxyl functional Resin Ingredient:

The hydroxyl functional resin which is reactive with the glycoluril amino resin crosslinker may be any solid resin which is conventionally known to have utility in amino resin systems. Such resins include hydroxyl functional acrylic resins, hydroxyl functional polyurethane resins, and hydroxyl functional polyester resins.

Hydroxyl functional resins based on either acrylics or polyesters may have pendent or terminal hydroxyl functionality and preferably have glass transition temperatures between 35° C. and 100° C.

A subset of resins having particular utility for powder coating compositions are crystalline polyesters having low melt viscosities. These resins are derived from 1,4-butanediol and trans-1,4-cyclohexanedicarboxylic acids, and are more fully described in U.S. Pat. No. 4,352,924. The polymers of the '1924 patent tend to have lower melt viscosities and generally give better melt flow in powder coating compositions.

Other specific hydroxyl functional resins all having weight average molecular weights from 2000 to 5000 and hydroxyl numbers from 25 to 40 which are useful in the invention are as follows:
1. Crylcoat TM 3109 polyester resin, a product of UCB Chemicals, Belgium.
2. Rucote TM 101 polyester resin, a product of Ruco Polymer Corporation,
3. Rucote TM XP-402, an internally catalyzed sulfonate bearing polyester resin, a product of Ruco Polymer Corporation,
4. Alftalat TM AN 745 polyester resin, a product of Hoechst Celanese Corporation,
5. Joncryl TM SCX-800 acrylic resin, a product of S.C. Johnson Corporation.

6. Crylcoat ™ 3493 polyester resin, a product of UCB Chemicals, Belgium.

The Strong Acid Catalyst Ingredient:

Strong acid catalysts, defined herein as catalysts having a pKa of less than 4, are generally recommended for use with glycoluril crosslinkers. Examples are p-toluene sulfonic acid, N-methanesulfonyl p-toluenesulfonamide (MTSI), dinonylnaphthalene disulfonic acid, dodecylbenzene sulfonic acid, and phosphoric acids.

Another desirable class of strong acids are the internally catalyzed sulfonate bearing hydroxyl terminated powder coating polyesters as more fully described in International Publication Number WO 91/10694. These sulfonate salt group bearing polyesters are synthesized by esterification or transesterification of glycols with polycarboxylic acids and also with a sulfonate salt bearing reactant such as 5-sodium sulfo isophthalic acid.

The Rheology Improving Additive:

The rheology improving additive of the invention is selected from the group consisting of alkali metal oxides, alkali metal hydroxides, alkali metal carbonates, alkaline earth metal carbonates, alkaline earth metal oxides, alkaline earth metal hydroxides, aluminum oxides, aluminum hydroxides, aluminum carbonates, zinc salts of long chain fatty acids (8 to 24 carbon atoms), aluminum salts of long chain fatty acids (8 to 24 carbon atoms), monoamines (e.g., 2,2,6,6,-tetramethyl-4-piperidinol), and diamines. The term, "alkali metal", as used herein refers to Group Ia (Li, Na, ..., etc.) and the term, "alkaline-earth", as used herein refers to Group IIa (Mg, Ca, ..., etc.) of the Periodic Table of Elements.

Surprisingly, it has been found that the addition of the above additive to the glycoluril based powder coating formulation results in a change of rheology during the critical f low out period before crosslinking begins, which has the practical and beneficial effect of increasing coating thickness and reducing defects.

Proportions of the Ingredients:

The relative proportions of the essential ingredients are not critical, but are generally found within the following limits:

| Essential Ingredient | Wt. % range based on Binder[1] in Powder Composition |
| --- | --- |
| Crosslinker | 3 to 20 |
| Hydroxyal functional resin | 80 to 97 |
| Strong acid catalyst | 0.1 to 10 |
| Rheology improver additive | 0.05 to 50 |

[1]Binder is the combined weight crosslinker and hydroxyl functional resin.

To arrive at the optimal amount of rheology additive it is desirable f or the user to prepare a series of rheology curves such as shown in FIG. 1. Thus, FIG. 1 shows the increasing benefit (lowering of viscosity before cure) of increasing triethylenediamine levels in curves 2 and 3. Curve 4, however, shows that too much triethylenediamine has been added and the method of judging suitable levels of rheology improving additive to be added to the powder coating composition. However, it is also sufficient to observe the appearance and physical properties of a coating made according to this invention to determine suitable rheology improver addition levels.

The components of the compositions according to this invention may be mixed by dry blending in a mixer or blender followed by compounding in an extruder and granulating, grinding and then screening to obtain a powder of suitable mesh size for coating. Alternatively some or all of the components may be dissolved in a solvent such as methylene chloride and spray dried at temperatures of about 50° C. by well-known techniques.

The Coating Method of the Invention:

The powder coating composition may be deposited on a substrate by use of a powder gun, by electrostatic deposition or by deposition from a fluidized bed or by other well-known methods of powder deposition. After deposition the powder is heated to a temperature sufficient to cause its particles to flow and thereafter crosslinks to form a coating on the substrate surface.

The following examples are submitted for a better understanding of the invention.

EXAMPLE 1

This Example describes the general procedure of testing and formulating glycoluril based amino resin powder coating compositions of the invention.

The following ingredients were melt mixed in a two roll mill at 125°-130° C. for 3 minutes. The resultant mixture was ground and classified to a powder paint of particle size 35 microns (plus or minus 10 microns): paint of particle size 35 microns (plus or minus 10 microns):

TABLE 1

| STANDARD POWDER PAINT FORMULATION | |
| --- | --- |
| Crylcoat 3109 polyester | 94.00 |
| Benzoin | 1.40 |
| MTSI catalyst | 0.50 |
| T—O$_2$ Pigment | 40.00 |
| Resiflow TMP-67 flow aid[1] | 1.30 |
| POWDERLINK ® 1174 resin | 6.00 |

[1]acrylic polymer absorbed on silica, product of Estron Corp.

Rheological cure profiles (FIG. 1 and FIG. 2) were measured for powder coating formulation using a Rheometrics RMS-605 mechanical spectrometer configured as a parallel plate rheometer. In these experiments complex viscosity was measured at a 2° C./min. heating rate, 10 rad/s oscillation frequency and varying strains. From these data were obtained flow index, average fluidity, fast cure onset temperature, minimum viscosity, and the graphs of the FIGURES.

The above composition was electrostatically sprayed onto iron phosphate treated cold rolled steel panels to give the film properties shown below:

TABLE 2

| FILM PROPERTIES FOR EXAMPLE 1 FORMULATION | | |
| --- | --- | --- |
| Substrate (iron phosphate treated CRS)[1] | BO 1000 | BO 1000 |
| Bake Temperature (°C.) | 175 | 190 |
| Bake Time (min.) | 20 | 20 |
| MEK Rub | 200+ | 200+ |
| Film Appearance | TOP[2] | TOP |
| Film Thickness (microns) | 50.8/55.9 | 45.7/71.1 |
| KNOOP Hardness | 11.8 | 11.9 |
| Impact F/R (Kg.-Meters) | 1.84/1.84 | 1.84/1.84 |
| Tristimulus Color | −0.05 | −0.05 |
| Gloss 60° | 78.5 | 94.1 |
| Gloss 20° | 45.6 | 77.2 |
| Salt Spray, Time (hrs) | 1008 | 1008 |
| Creepage | 0 | 0 |
| Appearance | 9 | 9 |
| Humidity, 60° C. (hrs) | 504 | 504 |
| | No Change | No Change |

[1]cold rolled steel, product of Parker Industries
[2]TOP = tight orangepeel, undesirable

EXAMPLE 2

The procedure and formulation of Example 1 were followed except that varying levels of triethylenediamine were used as a rheology improving additive as shown in Table 3 below:

TABLE 3

Effect of Triethylenediamine Rheology Improving Additive Addition

|  | Triethylenediamine wt. % on binder | | |
|---|---|---|---|
|  | 0.0 | 0.33 | 0.41 |
| Flow Index (1/Pa) | 27 | 72 | 112 |
| Ave. Fluidity (1/Pa · s) | 0.013 | 0.035 | 0.053 |
| Min. Viscosity (Pa · s) | 39 | 14 | 11 |
| Fast Cure Onset (°C.) | 172 | 200 | 214 |
| Gel Time[2] (seconds) | 358 | 515 | 775 |
| Vertical Plate Flow[3] (cm.) | 7.7 | 9.7 | 18.7 |
| Pinhole Free Film Thickness (microns) | 86.4 | >96.5 | >119.4 |
| Film Appearance | TOP | SOP | SOP[1] |

[1]SOP = smooth orangepeel, desirable
[2]at 200° C., using Powder Coating Institute Procedure No. 6, "Gel Time Reactivity", 1800 Diagonal Rd., Alexandria, VA 22314
[3]at 190° C., similar to Powder Coating Institute Procedure No. 7 for Inclined Plate Flow An additional composition was prepared using a higher triethyleneamine content of 0.50 weight percent on binder. This composition failed to cure.

The results of the Example 2 triethylenediamine rheology improving additive addition to the coating composition are graphically shown in FIG. 1. Curve "1" of FIG. 1 corresponds to the control composition of Table 3 containing no triethylenediamine. Curve "2" corresponds to the 0.33% addition of triethylenediamine as shown in Table 3. Curve "3" corresponds to the 0.41% addition of triethylenediamine as shown in Table 3. Curve "4" corresponds to the 0.50% addition of triethylenediamine described in the text after Table 3.

FIG. 1 shows that the addition of triethylenediamine creates a larger window of reduced viscosity. During this time the volatile byproducts incident to the curing/crosslinking process have a much enhanced opportunity to escape. The escape of volatile materials which do not form part of the coating results in a coating of better appearance, greater thickness and other desirable properties.

EXAMPLE 3

The procedure and formulation of Example 1 were followed except that varying levels of calcium carbonate were used as a rheology improving additive as shown in Table 4 below:

TABLE 4

Effect of Calcium Carbonate Rheology Improving Additive

|  | Calcium Carbonate wt. % on binder[1] | | | |
|---|---|---|---|---|
|  | 0 | 10 | 15 | 20 |
| Flow Index (1/Pa) | 21 | 42 | 68 | 90 |
| Ave. Fluidity (1/Pa · s) | 0.011 | 0.019 | 0.026 | 0.032 |
| Min. Viscosity (Pa · s) | 49 | 16 | 19 | 15 |
| Fast Cure Onset (°C.) | 185 | 192 | 210 | 219 |
| Gel Time (seconds) | 358 | 457 | 774 | 755 |
| Vertical Plate Flow (cm.) | 7.7 | 8.8 | 7.4 | 8.2 |
| Pinhole Free Film Thickness (microns) | 86.4 | 101.6 | 101.6 | 99.1 |
| Film Appearance | TOP | SOP | SOP | SOP[2] |

[1]calcium carbonate substituted for an equal weight of TiO$_2$ pigment
[2]SOP = smooth orangepeel, desirable This Example shows that when calcium carbonate is substituted for part of the composition TiO$_2$ pigment, an improvement in film thickness and appearance results.

Figure 2:
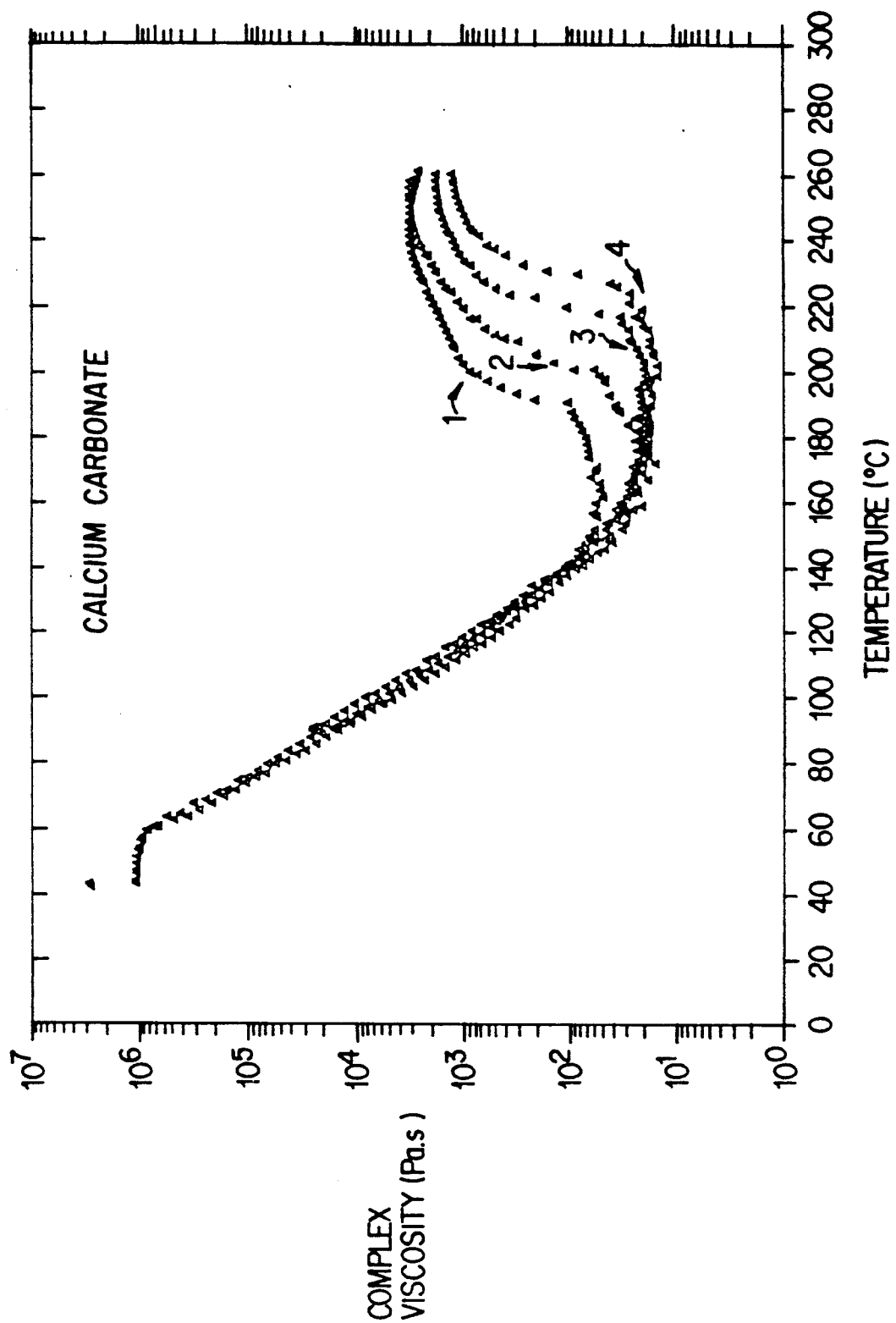
FIG. 2 is a rheology curve of glycoluril type amino resin crosslinked powder coating compositions with and without the rheology improving additive, calcium carbonate.

The results of the calcium carbonate rheology improver addition to the coating composition are graphically shown in FIG. 2. Curve "1" is a control composition with no calcium carbonate as shown in Table 4. Curve "2" corresponds to the 10% addition of calcium carbonate as shown in Table 4. Curve "4" corresponds to the 15% addition of calcium carbonate as shown in Table 4. Curve "4" corresponds to the 20% addition of calcium carbonate as shown in Table 4.

FIG. 2 shows that the addition of calcium carbonate creates a larger window of reduced viscosity. During this time the volatile byproducts incident to the curing/crosslinking process have a much enhanced opportunity to escape. The escape of volatile materials which do not form part of the coating results in a coating of better appearance, greater thickness and other desirable properties.

The invention has been described in detail with particular reference to preferred embodiments thereof, but it will be understood that variations and modifications can be effected within the spirit and scope of the invention.

We claim:

1. A curable powder coating composition comprising (i) a solid glycoluril amino resin crosslinker, (ii) a solid hydroxyl functional resin, (iii) a strong acid catalyst and (iv) an amount of a rheology improving additive effective to reduce the number of pinholes in films produced from said curable powder coating composition, wherein said rheology improving additive is selected from the group consisting of alkali metal oxides, alkali metal hydroxides, alkali metal carbonates, alkaline earth metal carbonates, alkaline earth metal oxides, alkaline earth metal hydroxides, aluminum oxides, aluminum hydroxides, aluminum carbonates, zinc salts of long chain fatty acids, aluminum salts of long chain fatty acids, 2,2,6,6-tetramethyl-4-piperidinol, diamines, mixtures thereof, and mixtures thereof with one or more monoamines other than 2,2,6,6-tetramethyl-4-piperidinol.

2. The curable powder coating composition of claim 1, wherein said rheology improving additive is selected from the group consisting of alkali metal carbonates and mixtures thereof with one or more alkali metal oxides, alkali metal hydroxides, alkaline earth metal carbonates, alkaline earth metal oxides, alkaline earth metal hydroxides, aluminum oxides, aluminum hydroxides, aluminum carbonates, zinc salts of long chain fatty acids, aluminum salts of long chain fatty acids, monoamines and diamines.

3. The curable powder coating composition of claim 1, wherein said rheology improving additive is selected from the group consisting of alkaline earth metal carbonates and mixtures thereof with one or more of alkali metal oxides, alkali metal hydroxides, alkali metal carbonates, alkaline earth metal oxides, alkaline earth metal hydroxides, aluminum oxides, aluminum hydroxides, aluminum carbonates, zinc salts of long chain fatty acids, aluminum salts of long chain fatty acids, monoamines and diamines.

4. The curable powder coating composition of claim 3, wherein said rheology improving additive is selected from the group consisting of calcium carbonate and mixtures thereof with one of more of alkali metal oxides, alkali metal hydroxides, alkali metal carbonates, alkaline earth metal carbonates other than calcium carbonate, alkaline earth metal oxides, alkaline earth metal hydroxides, aluminum oxides, aluminum hydroxides, aluminum carbonates, zinc salts of long chain fatty acids, aluminum salts of long chain fatty acids, monoamines and diamines.

5. The curable powder coating composition of claim 1, wherein said rheology improving additive is selected from the group consisting of aluminum carbonates and mixtures thereof with one or more of alkali metal oxides, alkali metal hydroxides, alkali metal carbonates, alkaline earth metal carbonates, alkaline earth metal oxides, alkaline earth metal hydroxides, aluminum oxides, aluminum hydroxides, zinc salts of long chain fatty acids, aluminum salts of long chain fatty acids, monoamines and diamines.

6. The curable powder coating composition of claim 1, wherein said rheology improving additive is selected from the group consisting of zinc salts of long chain fatty acids and mixtures thereof with one or more of alkali metal oxides, alkali metal hydroxides, alkali metal carbonates, alkaline earth metal carbonates, alkaline earth metal oxides, alkaline earth metal hydroxides, aluminum oxides, aluminum hydroxides, aluminum carbonates, aluminum salts of long chain fatty acids, monoamines and diamines.

7. The curable powder coating composition of claim 1, wherein said rheology improving additive is selected from the group consisting of aluminum salts of long chain fatty acids and mixtures thereof with one or more of alkali metal oxides, alkali metal hydroxides, alkali metal carbonates, alkaline earth metal carbonates, alkaline earth metal oxides, alkaline earth metal hydroxides, aluminum oxides, aluminum hydroxides, aluminum carbonates, zinc salts of long chain fatty acids, monoamines and diamines.

8. The curable powder coating composition of claim 1, wherein said rheology improving additive is selected from the group consisting of 2,2,6,6-tetramethyl-4-piperidinol and mixtures thereof with one or more of alkali metal oxides, alkali metal hydroxides, alkali metal carbonates, alkaline earth metal carbonates, alkaline earth metal oxides, alkaline earth metal hydroxides, aluminum oxides, aluminum hydroxides, aluminum carbonates, zinc salts of long chain fatty acids, aluminum salts of long chain fatty acids, monoamines other than 2,2,6,6-tetramethyl-4-piperidinol, and diamines.

9. The curable powder coating composition of claim 1, wherein said rheology improving additive is selected from the group consisting of diamines and mixtures thereof with one or more of alkali metal oxides, alkali metal hydroxides, alkali metal carbonates, alkaline earth metal carbonates, alkaline earth metal oxides, alkaline earth metal hydroxides, aluminum oxides, aluminum hydroxides, aluminum carbonates, zinc salts of long chain fatty acids, aluminum salts of long chain fatty acids, and monoamines.

10. The curable powder coating composition of claim 9, wherein said theology improving additive is selected from the group consisting of triethylenediamine and mixtures thereof with one or more of alkali metal oxides, alkali metal hydroxides, alkali metal carbonates, alkaline earth metal carbonates, alkaline earth metal oxides, alkaline earth metal hydroxides, aluminum oxides, aluminum hydroxides, aluminum carbonates, zinc salts of long chain fatty acids, aluminum salts of long chain fatty acids, monoamines and diamines other than triethylenediamine.

11. The curable powder coating composition of claim 1, wherein said strong acid catalyst is a sulfonimide catalyst.

12. The curable powder coating composition of claim 11, wherein said sulfonimide catalyst is N-methanesulfonyl p-toluenesulfonamide.

13. The curable powder coating composition of claim 1, wherein said hydroxyl functional resin is selected from the group consisting of hydroxyl functional acrylic resins, hydroxyl functional polyester resins, hydroxyl functional polyurethane resins and mixtures thereof.

14. The powder coating composition of claim 1, wherein the ingredients (ii), (ii), (iii) and (iv) have the following range of proportions:

| | |
|---|---|
| Crosslinker | 3 to 20 wt. % on binder |
| Hydroxyl functional resin | 97 to 80 wt. % on binder |
| Catalyst | 0.1 to 10 wt. % on binder |
| Rheology improving additive | 0.05 to 50 wt. % on binder. |

15. A curable powder coating composition comprising (i) a solid glycoluril amino resin crosslinker, (ii) a solid hydroxyl functional resin, (iii) a sulfonimide catalyst and (iv) an amount of a rheology improving additive effective to reduce the number of pinholes in films produced from said curable powder coating composition, wherein said rheology improving additive is selected from the group consisting of alkali metal oxides, alkali metal hydroxides, alkali metal carbonates, alkaline earth metal carbonates, alkaline earth metal oxides, alkaline earth metal hydroxides, aluminum oxides, aluminum hydroxides, aluminum carbonates, zinc salts of long chain fatty acids, aluminum salts of long chain fatty acids, monoamines, diamines and mixtures thereof.

16. The curable powder coating composition of claim 15, wherein said rheology improving additive is selected from the group consisting of alkali metal carbonates and mixtures thereof with one or more of alkali metal oxides, alkali metal hydroxides, alkaline earth metal carbonates, alkaline earth metal oxides, alkaline earth metal hydroxides, aluminum oxides, aluminum hydroxides, aluminum carbonates, zinc salts of long chain fatty acids, aluminum salts of long chain fatty acids, monoamines and diamines.

17. The curable powder coating composition of claim 15, wherein said rheology improving additive is selected from the group consisting of alkaline earth metal carbonates and mixtures thereof with one or more of alkali metal oxides, alkali metal hydroxides, alkali metal carbonates, alkaline earth metal oxides, alkaline earth metal hydroxides, aluminum oxides, aluminum hydroxides, aluminum carbonates, zinc salts of long chain fatty acids, aluminum salts of long chain fatty acids, monoamines and diamines.

18. The curable powder coating composition of claim 17, wherein said rheology improving additive is selected from the group consisting of calcium carbonate and mixtures thereof with one or more of alkali metal oxides, alkali metal hydroxides, alkali metal carbonates, alkaline earth metal carbonates other than calcium carbonates, alkaline earth metal oxides, alkaline earth metal hydroxides, aluminum oxides, aluminum hydroxides, aluminum carbonates, zinc salts of long chain fatty acids, aluminum salts of long chain fatty acids, monoamines and diamines.

19. The curable powder coating composition of claim 15, wherein said rheology improving additive is selected from the group consisting of aluminum carbonates and mixtures thereof with one or more of alkali metal oxides, alkali metal hydroxides, alkali metal carbonates, alkaline earth metal carbonates, alkaline earth metal oxides, alkaline earth metal hydroxides, aluminum oxides, aluminum hydroxides, zinc salts of long chain fatty acids, aluminum salts of long chain fatty acids, monoamines and diamines.

20. The curable powder coating composition of claim 15, wherein said rheology improving additive is selected from the group consisting of zinc salts of long chain fatty acids and mixtures thereof with one or more of alkali metal oxides, alkali metal hydroxides, alkali metal carbonates, alkaline earth metal carbonates, alkaline earth metal oxides, alkaline earth metal hydroxides, aluminum oxides, aluminum hydroxides, aluminum carbonates, aluminum salts of long chain fatty acids, monoamines and diamines.

21. The curable powder coating composition of claim 15, wherein said rheology improving additive is selected from the group consisting of aluminum salts of long chain fatty acids and mixtures thereof with one or more of alkali metal oxides, alkali metal hydroxides, alkali metal carbonates, alkaline earth metal carbonates, alkaline earth metal oxides, alkaline earth metal hydroxides, aluminum oxides, aluminum hydroxides, aluminum carbonates, zinc salts of long chain fatty acids, monoamines and diamines.

22. The curable powder coating composition of claim 15, wherein said rheology improving additive is selected from the group consisting of monoamines and mixtures thereof with one or more of alkali metal oxides, alkali metal hydroxides, alkali metal carbonates, alkaline earth metal carbonates, alkaline earth metal oxides, alkaline earth metal hydroxides, aluminum oxides, aluminum hydroxides, aluminum carbonates, zinc salts of long chain fatty acids, aluminum salts of long chain fatty acids and diamines.

23. The curable powder coating composition of claim 22, wherein said rheology improving additive is selected from the group consisting of 2,2,6,6-tetramethyl-4-piperidinol and mixtures thereof with one or more of alkali metal oxides, alkali metal hydroxides, alkali metal carbonates, alkaline earth metal carbonates, alkaline earth metal oxides, alkaline earth metal hydroxides, aluminum oxides, aluminum hydroxides, aluminum carbonates, zinc salts of long chain fatty acids, aluminum salts of long chain fatty acids, monoamines other than 2,2,6,6-tetramethyl-4-piperidinol, and diamines.

24. The curable powder coating composition of claim 15, wherein said rheology improving additive is selected from the group consisting of diamines and mixtures thereof with one or more of alkali metal oxides, alkali metal hydroxides, alkali metal carbonates, alkaline earth metal carbonates, alkaline earth metal oxides, alkaline earth metal hydroxides, aluminum oxides, aluminum hydroxides, aluminum carbonates, zinc salts of long chain fatty acids, aluminum salts of long chain fatty acids, and monoamines.

25. The curable powder coating composition of claim 24, wherein said rheology improving additive is selected from the group consisting of triethylenediamine and mixtures thereof with one or more of alkali metal oxides, alkali metal hydroxides, alkali metal carbonates, alkaline earth metal carbonates, alkaline earth metal oxides, alkaline earth metal hydroxides, aluminum oxides, aluminum hydroxides, aluminum carbonates, zinc salts of long chain fatty acids, aluminum salts of long chain fatty acids, monoamines and diamines other than triethylenediamine.

26. The curable powder coating composition of claim 15, wherein said sulfonimide catalyst is N-methanesulfonyl p-toluenesulfonamide.

27. The curable powder coating composition of claim 15, wherein said hydroxyl functional resin is selected from the group consisting of hydroxyl functional acrylic resins, hydroxyl functional polyester resins, hydroxyl functional polyurethane resins and mixtures thereof.

28. The curable powder coating composition of claim 15, wherein the ingredients (i), (ii), (iii) and (iv) have the following range of proportions:

| Crosslinker | 3 to 20 wt. % on binder |
|---|---|
| Hydroxyl functional resin | 97 to 80 wt. % on binder |
| Catalyst | 0.1 to 10 wt. % on binder |
| Rheology improving additive | 0.05 to 50 wt. % on binder. |

29. A method of coating substrates by applying the powder coating composition according to claim 1 and heating the same until cure.

30. The method of claim 29, wherein heating is conducted at temperatures between 150° C. and 230° C.

31. A method of coating substrates by applying the powder coating composition according to claim 15 and heating the same until cure.

32. The method of claim 31, wherein heating is conducted at temperatures between 150° C. and 230° C.

* * * * *